United States Patent [19]

Watanabe et al.

[11] Patent Number: 5,368,457
[45] Date of Patent: Nov. 29, 1994

[54] FLUID COMPRESSOR HAVING A MOLDED HELICAL BLADE

[75] Inventors: Noriko Watanabe; Satoshi Oyama, both of Kanagawa, Japan

[73] Assignee: Kabushiki Kaisha Toshiba, Kawasaki, Japan

[21] Appl. No.: 77,743

[22] Filed: Jun. 18, 1993

[30] Foreign Application Priority Data

Jun. 18, 1992 [JP] Japan .................. 4-159245

[51] Int. Cl.$^5$ ............................. F01C 21/08
[52] U.S. Cl. ..................... 418/220; 418/153; 418/179; 425/573; 425/577; 425/DIG. 58; 264/318; 264/328.8
[58] Field of Search ............... 418/220, 154, 179, 153; 425/573, 577, DIG. 58; 264/318, 328.8, 328.12

[56] References Cited

U.S. PATENT DOCUMENTS

| 2,401,189 | 5/1946 | Quiroz. | |
|---|---|---|---|
| 4,871,304 | 10/1989 | Iida et al. | 418/220 |
| 4,994,220 | 2/1991 | Gutjahr et al. | 425/573 |
| 5,122,052 | 6/1992 | Trame et al. | 425/DIG. 58 |

FOREIGN PATENT DOCUMENTS 4060192  2/1992  Japan .................. 418/220

Primary Examiner—Richard A. Bertsch
Assistant Examiner—Charles G. Freay
Attorney, Agent, or Firm—Foley & Lardner

[57] ABSTRACT

A fluid compressor has a cylinder (17), a rotary rod (21), and a helical blade (33) that defines work chambers (44) between the cylinder and the rod. The compressor successively compresses and conveys a fluid from a suction end to a discharge end through the work chambers according to the rotation of the rod. The continuous helical blade is formed by pressurizing and injecting synthetic resin material such as tetrafluoroethylene-perfluoroalkylvinylether polymer resin into a mold through two gates (39), so that a weld line (43) of the blade is located in an intermediate region between a suction pressure region and a discharge pressure region of the blade.

7 Claims, 10 Drawing Sheets

FLUID COMPRESSOR HAVING A MOLDED HELICAL BLADE

BACKGROUND OF THE INVENTION

1. Field of the Invention

The present invention relates to a helical blade fluid compressor for compressing a fluid such as a coolant gas in a refrigerating cycle, and particularly, to a helical blade fluid compressor with a blade having high dimensional accuracy and a method of fabricating such a blade.

2. Description of the Prior Art

Compressors are usually classified into reciprocating ones and rotary ones. There are also helical blade compressors that successively compress and convey a coolant From the suction side of a cylinder of the compressor toward the discharge side thereof through work chambers defined in the cylinder.

FIG. 1 shows an example of a conventional helical blade compressor.

The compressor includes a drive unit having a stator 101 and a rotor 103. The drive unit drives a cylinder 105. The cylinder 105 accommodates a rotary rod 109, which is eccentric to the cylinder 105 by a distance e. The rod 109 is rotatable relative to the cylinder 105 through an oldham ring 107.

A helical groove 111 is formed around the rod 109 along the length thereof. A helical blade 113 is fitted in the groove 111 in which the blade 113 is movable inwardly and outwardly. The periphery of the blade 113 is in contact with the inner face of the cylinder 105. The blade 113 and rod 109 turn together.

The rod 109 rotates relative to the cylinder 105 at the eccentric position, to produce a relative velocity between the periphery of the rod 109 and the inner face of the cylinder 105. This relative velocity changes in a period of one turn. Accordingly, the blade 113 moves inwardly and outwardly in the groove 111. At this time, the blade 113 defines work chambers 115 along the rod 109 between the cylinder 105 and the rod 109.

As shown in FIG. 2, the volume of each work chamber 115 is determined by a corresponding pitch P of the helical groove 111 to which the blade 113 is fitted. The pitches of the groove 111 gradually become shorter from the suction side of the rod 109 toward the discharge side thereof. The volumes of the work chambers 115, therefore, gradually decrease from the suction side adjacent to a suction pipe 117 toward the discharge side adjacent to a discharge pipe 119. Due to this configuration of the compressor, a coolant is gradually compressed and conveyed from the suction side toward the discharge side.

The blade 113 that defines the work chambers 115 for conveying and compressing a coolant must be resistive against the coolant and compressing pressure. In addition, the blade 113 must be elastically deformable so that it may be easily fitted to the helical groove 111. The blade 113, therefore, may be made of synthetic resin that has a small coefficient of friction, high coolant resistance, high heat S resistance, and a low bending elastic modulus. Such synthetic resin may be tetrafluoroethylene-perfluoroalkylvinylether copolymer resin (PFA resin), and the blade 113 is formed from the resin by injection molding.

FIG. 3 partly shows an example of an injection molding machine for forming the blade 113.

A metal mold 129 has a cylindrical insert 123 and a separable frame 127. The insert 123 has a helical groove 121. The pitches of the groove 121 correspond to those of the helical groove 111 formed around the rod 109. The insert 123 is removably inserted in the frame 127, to define a continuous helical blade molding chamber 125 between them. The mold 129 has a gate 131 through which synthetic resin is forcibly injected into the chamber 125 to mold the blade 113.

Proper molding conditions of the PFA resin are limited. If the molding conditions are not proper, a delamination defect will occur in the blade 113. The delamination is caused by a sudden change in the concentration of the PFA resin in the blade 113. The delamination usually occurs when a shearing speed and shearing stress are high. Accordingly, a slow injection speed and a low injection pressure are required to prevent the delamination when molding the blade 113.

If there is only one gate 131, a flow length and a pressure loss will increase during the injection molding, to deteriorate the dimensional accuracy of a blade to be Formed. To improve the dimensional accuracy, the injection speed and pressure must be high. This, however, causes the delamination because material properties easily change between the Front end and the rear end of the single gate molding system.

To solve this problem, a two-gate molding system may be employed to inject synthetic resin from both ends of a mold. This system involves a short flow length and a low pressure loss, to prevent the delamination. This technique, however, forms a weld line in a molded blade at a junction where resin materials fed from each end meet each other. Since the weld line is weak in strength, it deteriorates the reliability of the blade.

SUMMARY OF THE INVENTION

An object of the present invention is to provide a fluid compressor with a blade having high dimensional accuracy, durability, and reliability, and a method of forming such a blade.

In order to accomplish the object, a fluid compressor according to the present invention has a cylinder driven by a drive unit and having a suction port and a discharge port; a cylindrical rotary rod eccentrically disposed in and along the cylinder so that the periphery thereof is partly in contact with the inner face of the cylinder, the cylinder and rod being turnable relative to each other; an oldham ring supported by the rod and sliding toward and away from an axis of the cylinder according to the rotation of the cylinder, to rotate the rod relative to the cylinder; a helical groove formed around the rod at pitches that gradually become shorter from the suction port side toward the discharge port side; and a helical blade fitted to the helical groove and being movable inwardly and outwardly in the groove. The periphery of the blade is in contact with the inner face of the cylinder, to define work chambers between the inner face of the cylinder and the peripheral face of the rod. The fluid compressor compresses and conveys a coolant from the suction port toward the discharge port through the work chambers according to the rotation of the rod.

The continuous helical blade is molded by injecting materials into a mold through two gates disposed at each end of the mold. A weld line formed in the blade due to the injection molding is located in an intermediate pressure region between a suction pressure region and a discharge pressure region of the blade.

The materials for molding the blade may be tetrafluoroethylene-perfluoroalkylvinylether copolymer resin.

The two gate configuration of the mold reduces a flow length of the synthetic resin material, slows an injection speed, and decreases an injection pressure, to improve the dimensional accuracy of the blade. This results in preventing delamination of the blade.

Since the weld line of the blade is located in the intermediate pressure region between the suction pressure region and the discharge pressure region of the blade, the blade will not easily break and provides stable operation.

These and other objects, features and advantages of the present invention will be more apparent from the following detailed description of preferred embodiments in conjunction with the accompanying drawings.

DETAILED DESCRIPTION OF THE EMBODIMENTS

An embodiment of the present invention will be explained with reference to FIGS. 4 to 9.

Figure 5:
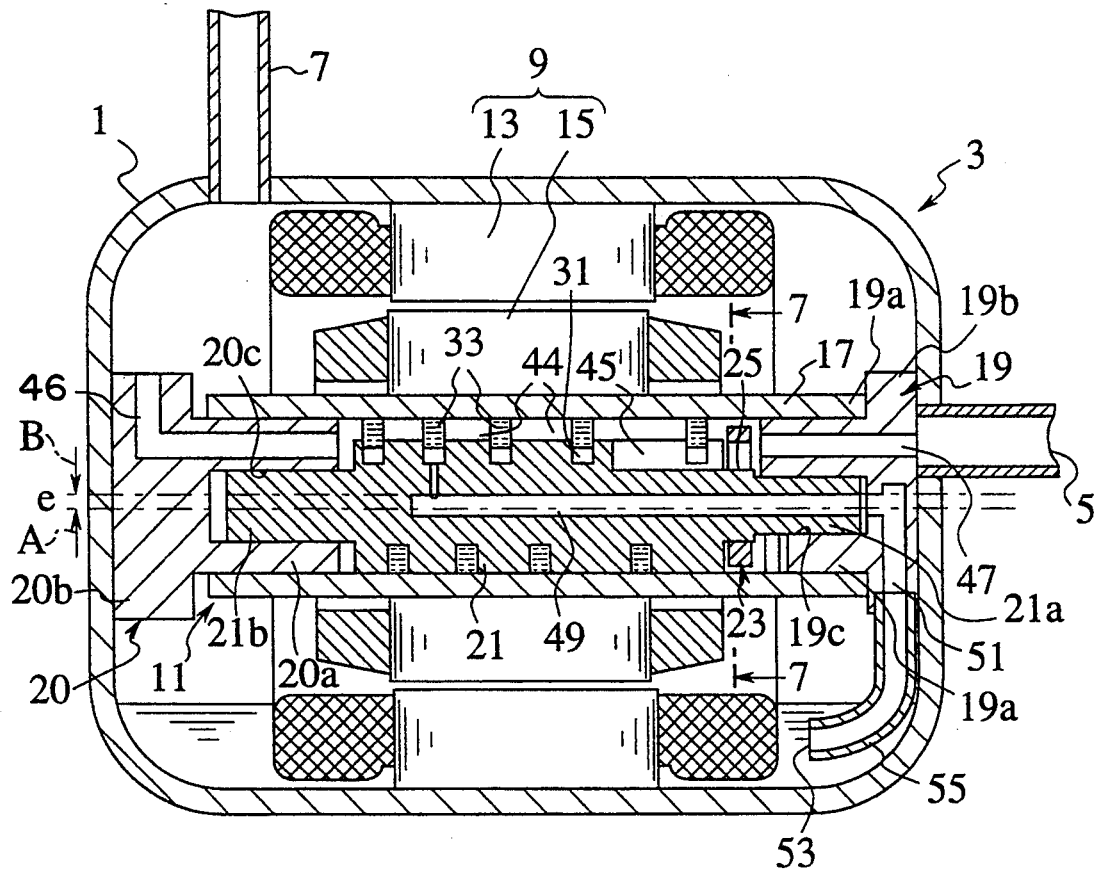
FIG. 5 is a section showing a fluid compressor according to the present invention.
Figure 6:
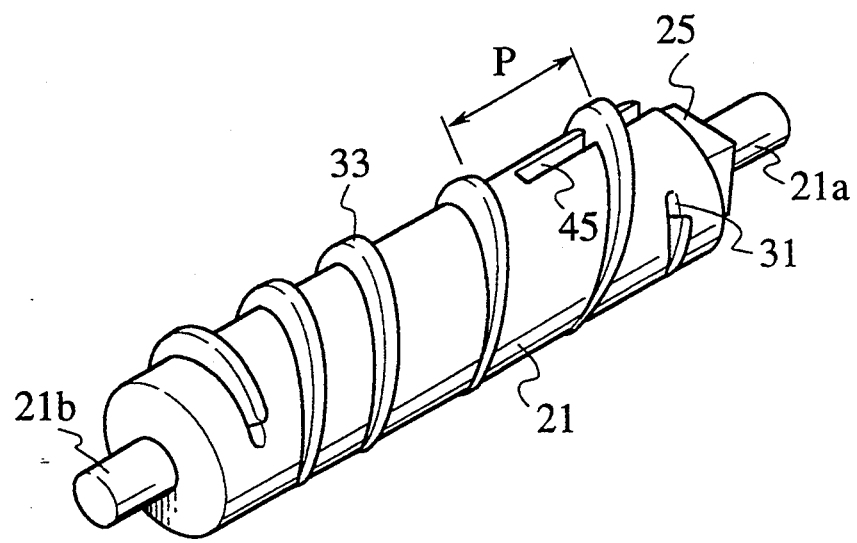
FIG. 6 is a perspective view showing a rotary rod of the compressor of FIG. 5.

FIG. 5 shows a closed fluid compressor 3 used for a refrigerating cycle.

The compressor 3 has a closed casing 1, a suction pipe 5 connected to one end of the casing 1, and a discharge pipe 7 connected to the other end of the casing 1. The casing 1 accommodates a driving motor 9 and a compression unit 11.

The motor 9 involves a stator 13 fixed to the inner face of the casing 1 and a rotor 15 rotatably disposed inside the stator 13.

The compression unit 11 includes a cylinder 17 having open ends. These ends are rotatably supported by bearings 19 and 20, which are fixed to the inner face of the casing 1. The bearing 19 (20) has a boss 19a (20a) for rotatably receiving one end of the cylinder 17 and a base 19b (20b) fixed to the inner face of the casing 1. The diameter of the base 19b (20b) is greater than that of the boss 19a (20a). The ends of the cylinder 17 are airtightly sealed.

A cylindrical rotary rod 21, which is thinner than the inner diameter of the cylinder 17, is arranged in and along the cylinder 17. A center axis A of the rod 21 is eccentric to a center axis B of the cylinder 17. Namely, the axis A is downwardly displaced from the axis B by a distance e so that part of the rod 21 is in linear contact with the inner face of the cylinder 17.

Ends of the rod 21 form thin supports 21a and 21b, which are rotatably inserted into and supported by bearing holes 19c and 20c, respectively. The bearing holes 19c and 20c are formed in the bosses 19a and 20a of the bearings 19 and 20, respectively.

The support 21a of the rod 21 has a square section 25 for providing power transmission faces to which torque of the cylinder 17 is transmitted through an oldham ring 23.

Figure 7:
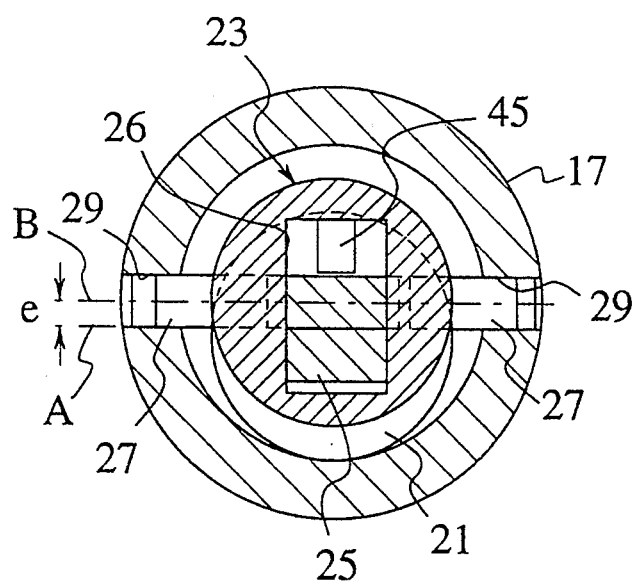
FIG. 7 is a section taken along a line 7—7 of FIG. 5.

In FIG. 7, the oldham ring 23 has a rectangular long hole 26 into which the square section 25 of the rod 21 is inserted with a clearance between them. Due to the clearance, the square section 25 can slide within the long hole 26 toward and away from the center axis A.

The periphery of the oldham ring 23 has holes for receiving one ends of a pair of transmission pins 27. These pins 27 are free to slide in the holes in a diametral direction orthogonal to the length of the long hole 26. The other ends of the pins 27 are fixed in holes 29 formed in the inner wall of the cylinder 17. Accordingly, the rod 21 is smoothly connected to the cylinder 17 at the eccentric position, and the torque of the cylinder 17 is transmitted to the rod 21 through the oldham ring 23.

When the motor 9 is energized to turn the rotor 15 and cylinder 17 together, the rod 21 eccentrically turns relative to the cylinder 17 through the oldham ring 23. At this time, a relative velocity difference occurs between the periphery of the rod 21 and the inner face of the cylinder 17. This relative velocity difference changes in a period of one turn. The rod 21 turns in and relative to the cylinder 17, without revolving.

In FIG. 5, a helical groove 31 is formed around the rod 21. Pitches P of the helical groove 31 gradually become shorter from the suction side toward the discharge side. A helical blade 33 having elasticity is fitted to the helical groove 31. The blade 33 is movable inwardly and outwardly in the groove 31.

Figure 8:
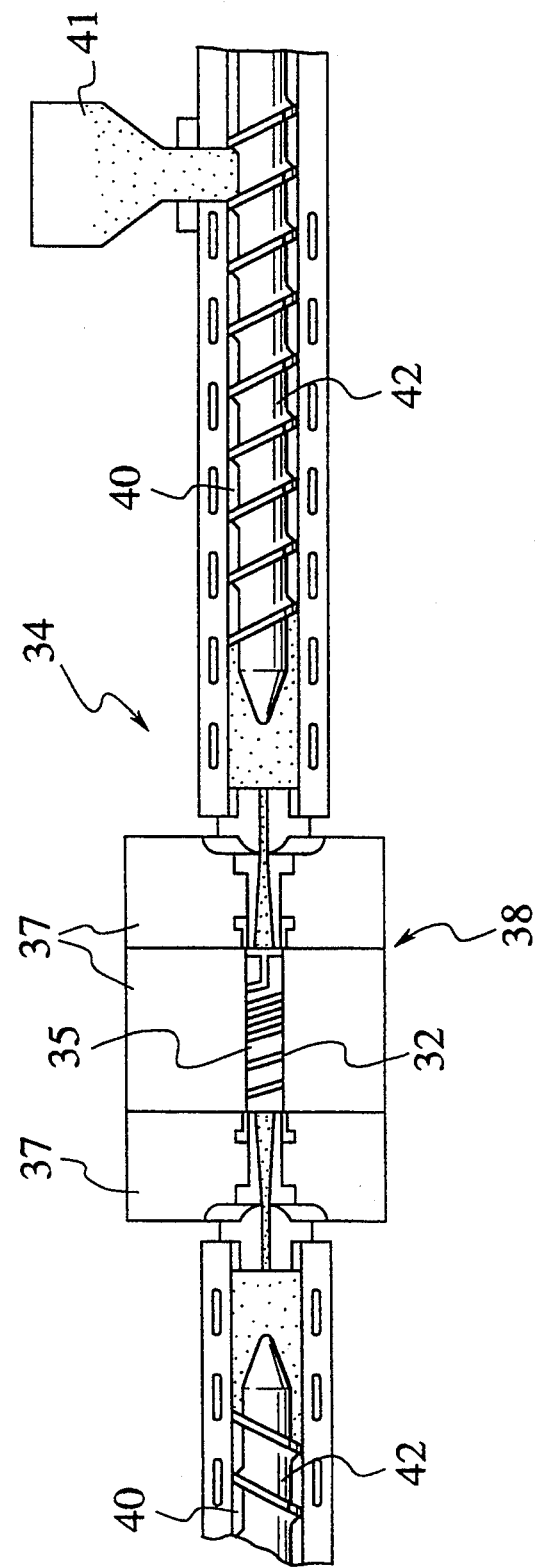
FIG. 8 shows an injection molding machine used for forming the blade of FIG. 4.
Figure 9:
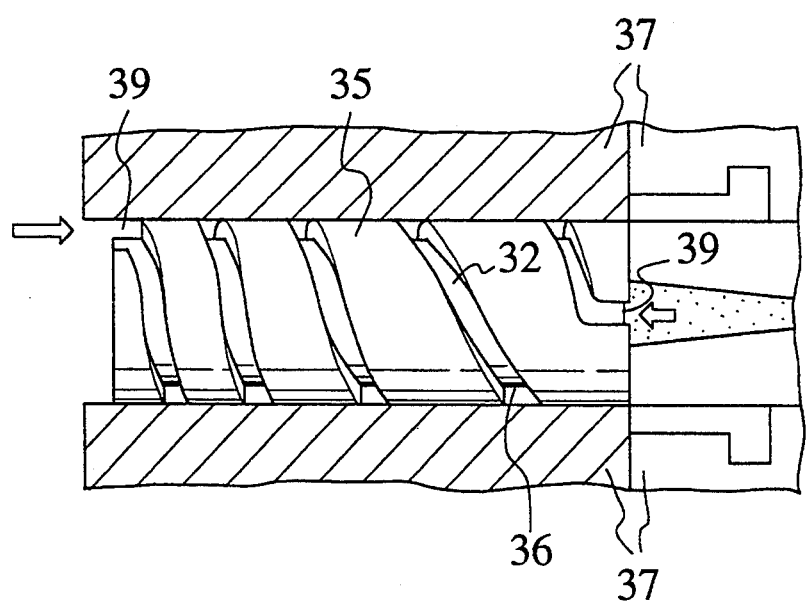
FIG. 9 shows left and right gates of the molding machine of FIG. 8.

FIGS. 8 and 9 show an injection molding machine 34 used for molding the helical blade 33.

The molding machine 34 employs a metal mold 38. The mold 38 has a cylindrical insert 35 and a separable frame 37. The insert 35 has a helical groove 32. The pitches of the groove 32 correspond to those of the helical groove 31 formed around the rod 21. The insert 35 is removably inserted into the frame 37, to define a continuous helical blade molding chamber 36 between them. The frame 37 is divided into three sections.

Cylinders 40 are located on each side of the mold 38, to inject PFA resin into the mold 38 through gates 39. Each cylinder 40 has a hopper 41 for charging the resin into a screw 42. The screw 42 achieves rotating motion to feed the resin from the hopper 41 toward the mold 38 and reciprocating motion to pressurize and inject a given quantity of the resin into the mold 38.

In FIG. 9, each of the two gates 39 is connected to the blade molding chamber 36 to mold the material injected from the cylinder 40 into the blade 33.

Figure 1:
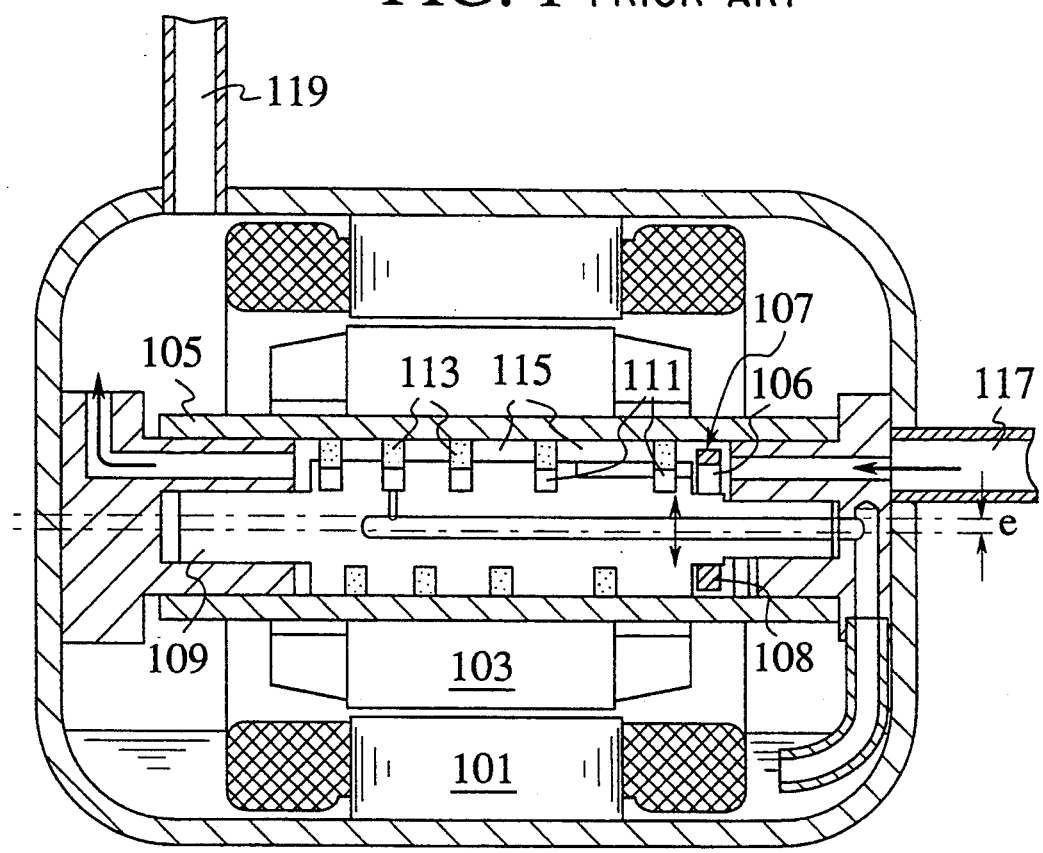
FIG. 1 is a section showing a conventional fluid compressor.
Figure 2:
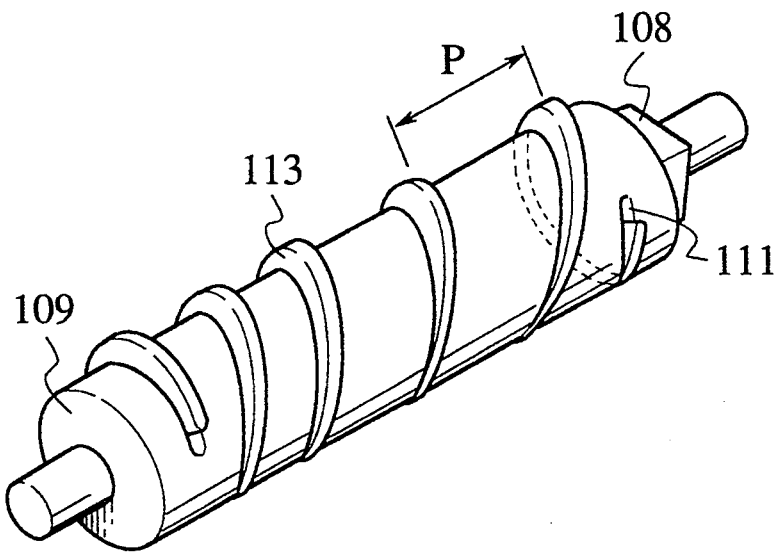
FIG. 2 is a perspective view showing a rotary rod of the compressor of FIG. 1.
Figure 3:
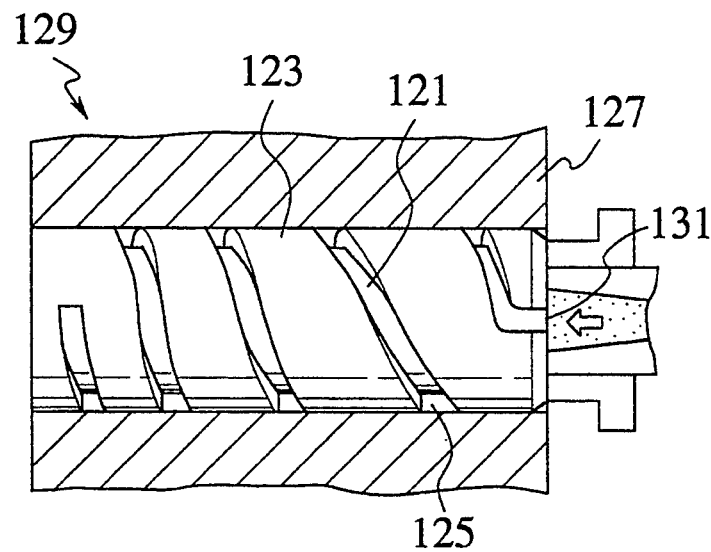
FIG. 3 shows a gate of a one-gate molding machine.
Figure 4:
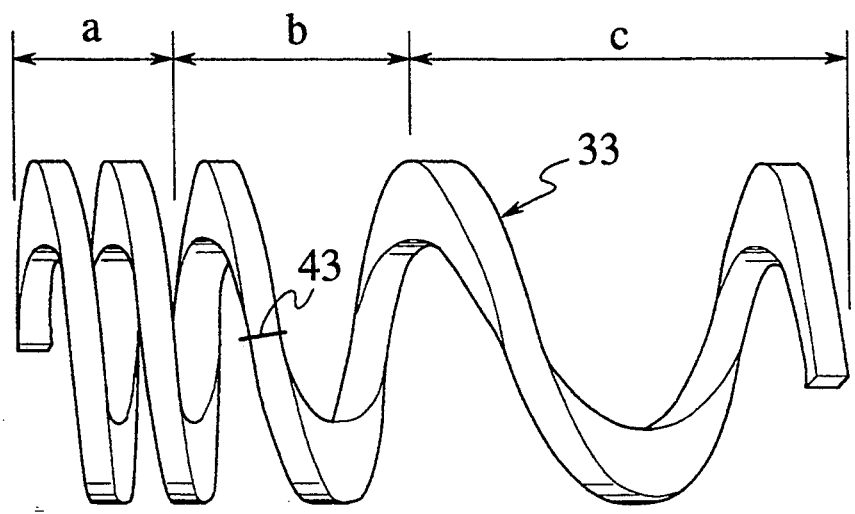
FIG. 4 is a perspective view showing a helical blade according to the present invention.

When the resin is injected into the mold 38 through the two gates 39, a weld line 43 is formed in the blade 33, as shown in FIG. 4.

According to the present invention, the weld line 43 is located substantially at the center of an intermediate pressure region b between a suction pressure region c and a discharge pressure region a of the blade 33. The suction pressure region c is a region to cause a largest twist. The discharge pressure region a is a region to cause a largest pressure difference and a largest temperature difference.

Figure 10A:
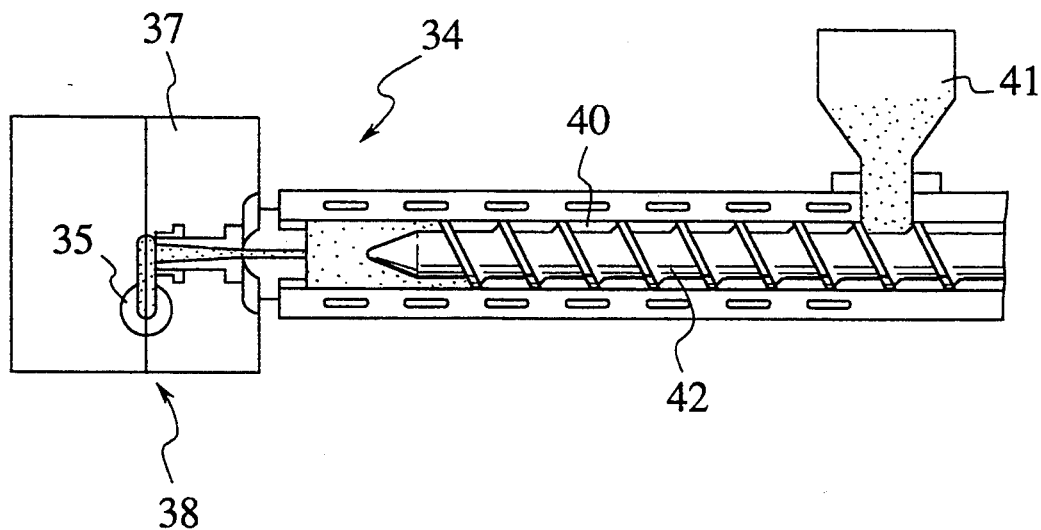
FIG. 10a–10c shows a modification of the injection molding machine of FIG. 8.
Figure 10B:
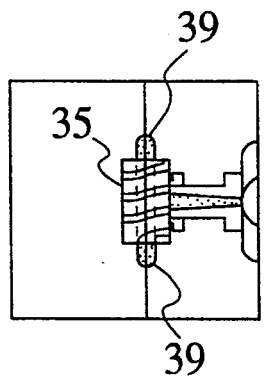
Figure 10C:
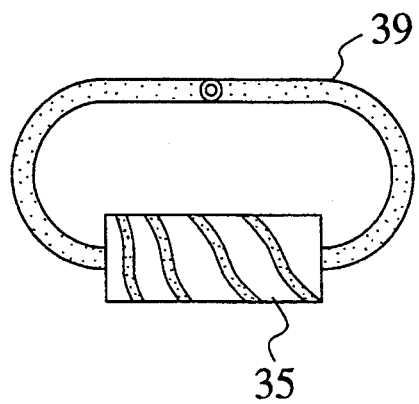

FIGS. 10(a) to 10(c) show a modification of the injection molding machine 34, in which FIG. 10(a) is a side view, FIG. 10(b) is a partial plan view, and FIG. 10(c) is a partial front view.

This modification involves a separable frame 37 divided into two sections, and a single cylinder 40. The cylinder 40 feeds material resin to two gates 39. The gates 39 are connected to each end of a blade molding chamber 36 defined by an insert 35. Namely, the material resin from the cylinder 40 is injected into the chamber 36 from each end thereof.

Returning to FIG. 5, the blade 33 defines work chambers 44 between the cylinder 17 and the rod 21. The first work chamber 44 adjacent to the suction port has the largest volume. Volumes of the work chambers 44 gradually decrease From the suction port side toward the discharge port side. The last work chamber 44 adjacent to the discharge port communicates with a discharge hole 46, which is formed in the bearing 20 and open in the casing 1.

In FIG. 7, each work chamber 44 extends along the blade 33 From one contact portion between the rod 21 and the inner face of the cylinder 17 to the next contact portion, to form a crescent shape.

In FIG. 5, the first work chamber 44 adjacent to the suction port is connected to the suction pipe 5 of the refrigerating cycle through a main path 45 formed in the end of the rod 21 and a suction path 47 formed in the bearing 19. Accordingly, a coolant is surely and continuously guided From the suction pipe 5 into the first work chamber 44.

The rod 21 has a lubricant path 49. One end of the lubricant path 49 is connected to the helical groove 31 and the other end thereof to a communication hole 51 formed in the bearing 19. The hole 51 communicates with a guide tube 55 having a suction mouth 53 open in the vicinity of the bottom of the casing 1. When pressure in the casing 1 increases, lubricant on the bottom of the casing 1 is supplied to the helical groove 31 through the guide pipe 55, communication hole 51, and lubricant path 49, to help the blade 33 smoothly move inwardly and outwardly in the groove 31.

The operations of the fluid compressor will be explained.

The motor 9 is energized to turn the rotor 15 and cylinder 17 together. The rod 21 is turned through the oldham ring 23. Since the rod 21 is eccentric to the cylinder 17, a relative velocity difference occurs between the inner face of the cylinder 17 and the periphery of the rod 21. The relative velocity difference changes in a period of one turn of the cylinder 17. The rod 21 turns relative to the cylinder 17. As a result, a fluid such as a coolant is fed into the first work chamber 44 adjacent to the suction port. The confined coolant is successively compressed and conveyed through the work chambers 44 and discharged into the discharge pipe 7 from the last work chamber 44 adjacent to the discharge port.

The weld line 43 of the blade 33 is located substantially at the center of the intermediate pressure region b which involves relatively small twist, pressure difference, and temperature difference. The weld line 43, therefore, is not so strongly influenced by the compressing and conveying operations of the fluid compressor. Accordingly, the blade 33 stably works for a long time.

Figure 11:
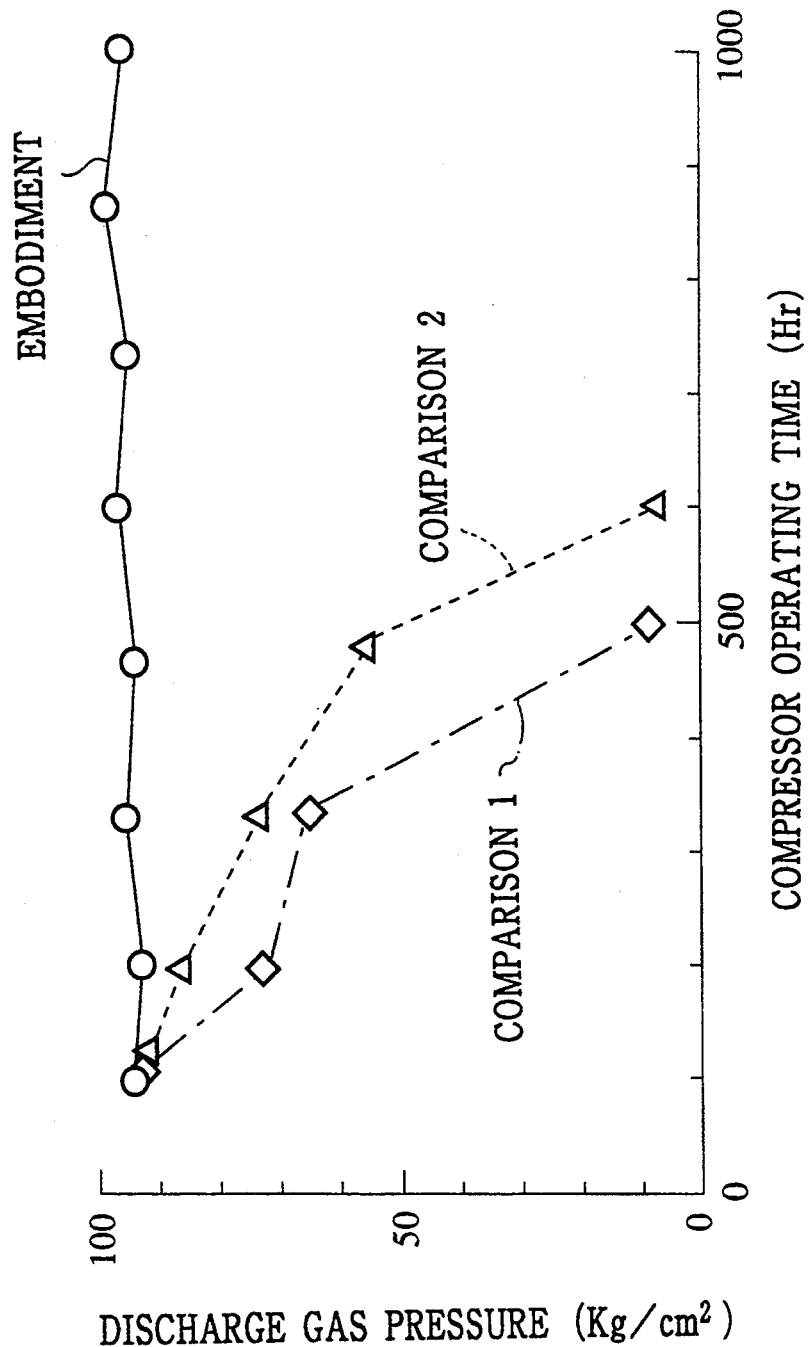
FIG. 11 shows results of durability tests.

FIG. 11 shows results of durability tests carried out on blades of comparisons 1 and 2 and the present invention installed in a fluid compressor.

Figure 12:
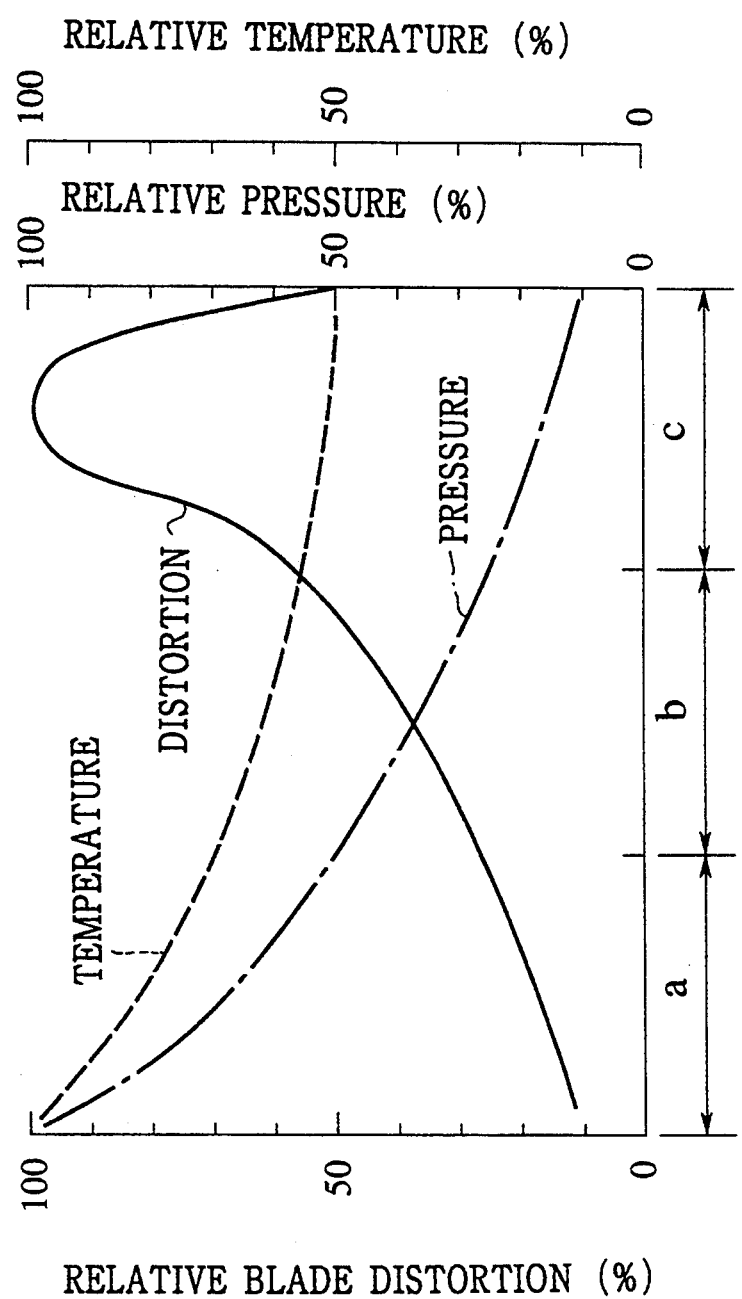
FIG. 12 is a characteristic diagram showing relative blade distortion.
Figure 13:
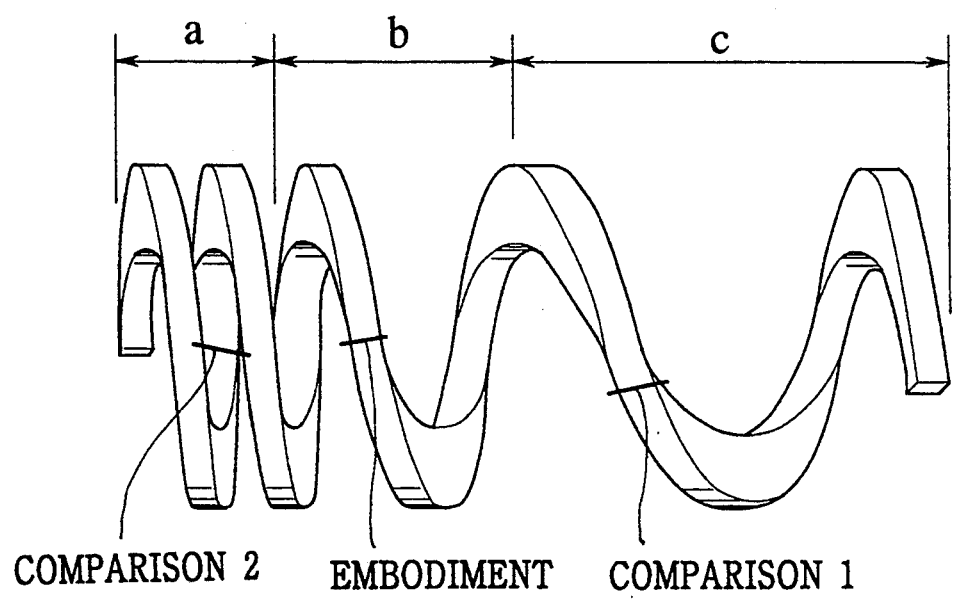
FIG. 13 shows weld lines formed in a helical blade, according to comparisons 1 and 2 and the present invention.

Referring to FIGS. 12 and 13, a weld line of the blade of the comparison 2 is located in the discharge pressure region a. A work chamber defined in this region is subjected to a relative distortion of less than 25%, a relative pressure of more than 50%, and a relative temperature of more than 70%.

A weld line of the blade of the comparison 1 is located in the suction pressure region c. A work chamber defined in this region is subjected to a relative distortion of more than 55%, a relative pressure of less than 20%, and a relative temperature of less than 55%.

In the test results of FIG. 11, the blade 33 of the present invention caused no decrease in coolant gas discharge pressure even after 1000 hours of operation. This blade 33 showed no abrasion nor fatigue even after 1000 hours of operation.

The comparison 1 caused a sudden decrease in discharge gas pressure after 500 hours of operation, and the fluid compressor of the comparison 1 had to be stopped. Part of the blade of the comparison 1 in the region c adjacent to the suction port caused a fatigue failure because of the severest twist in the region c.

The comparison 2 failed after 600 hours of operation, and the fluid compressor of the comparison 2 had to be stopped. The region a where the weld line of the comparison 2 is present is strongly affected by high temperature and high pressure. This is the reason why the comparison 2 was quickly fatigued and broken after 600 hours of operation.

The decrease in discharge gas pressure observed in the comparisons 1 and 2 indicates that breakage at the weld line of the blade deteriorated the sealing ability.

The above embodiment relates to a single fluid compressor that conveys and compresses a fluid in one direction. The present invention is also applicable for a system involving two compressors facing each other because each compressor basically employs the same arrangement as the compressor explained above.

In summary, the present invention provides a helical blade having high dimensional accuracy suitable for a helical fluid compressor. The blade seldom breaks at a weld line thereof, to thereby provide excellent durability. The blade, therefore, secures the original performance of the compressor for a long time and improves the reliability of the compressor.

Various modifications will become possible for those skilled in the art after receiving the teachings of the present disclosure, without departing from the scope thereof.

What is claimed is:

1. A fluid compressor comprising:
   (a) a cylinder driven by a drive unit and having a suction port and a discharge port;
   (b) a cylindrical rotary rod eccentrically disposed in and along said cylinder so that a periphery thereof is partly in contact with an inner face of said cylinder, said cylinder and rod being turnable relative to each other;
   (c) an oldham ring supported by said rod and sliding toward and away from an axis of said cylinder according to the rotation of said cylinder, to rotate said rod relative to said cylinder;

(d) a helical grove formed around said rod at pitches that gradually become shorter from a suction port side toward a discharge port side;

(e) a helical blade fitted to said helical groove and movable inwardly and outwardly in said groove, a periphery of said blade being in contact with the inner face of said cylinder and subjected to torsion, to define a plurality of work chambers between the inner face of said cylinder and a peripheral face of said rod, so that a fluid fed through the suction port is compressed and conveyed toward the discharge port through the work chambers according to the rotation of said rod; and (f) said helical blade being molded by injecting materials into a mold through two gates disposed at each end of the mold, so that a weld line is formed in an intermediate pressure region between a suction pressure region and a discharge pressure region of said blade.

2. The fluid compressor according to claim 1, wherein the weld line where the materials fed through the two gates meet each other during the injection molding is located substantially at the center of the intermediate pressure region between the suction pressure region that causes a largest twist in said blade and the discharge pressure region that causes a highest pressure difference and a highest temperature difference on said blade.

3. In a fluid compressor having a cylinder driven by a drive unit and having a suction port and a discharge port; a cylindrical rotary rod eccentrically disposed in and along the cylinder so that a periphery thereof is partly in contact with an inner face of the cylinder, the cylinder and rod being turnable relative to each other; an oldham ring supported by the rod and sliding toward and away from an axis of the cylinder according to the rotation of the cylinder, to rotate the rod relative to the cylinder; a helical groove formed around the rod at pitches that gradually become shorter from a suction port side toward a discharge port side; and a helical blade fitted to the helical groove and movable inwardly and outwardly in the groove, a periphery of the blade being in contact with the inner face of the cylinder and subjected to torsion, to define a plurality of work chambers between the inner face of the cylinder and a peripheral face of the rod, the helical blade comprising;

a weld line formed when the helical blade is molded by injecting materials into a mold in two directions, said weld line being located in an intermediate pressure region between a suction pressure region and a discharge pressure region of the blade.

4. The blade according to claim 3, wherein said weld line where the materials fed through the two gates meet each other during the injection molding is located substantially at the center of the intermediate pressure region between the suction pressure region that causes a largest twist in the blade and the discharge pressure region that causes a highest pressure difference and a highest temperature difference on the blade.

5. An injection molding machine for molding a helical blade having variable pitches and employable for a fluid compressor, comprising:

(a) an insert having a helical groove;

(b) a metal mold into which said insert is inserted to form a continuous helical blade molding chamber between an inner face of said mold and said insert; and (c) means for pressurizing and injecting materials in two directions into the molding chamber through two gates, to mold the blade having a weld line, the weld line where the materials fed through the two gates meet each other being located substantially at the center of an intermediate pressure region between a suction pressure region and a discharge pressure region of the blade, the suction pressure region causing a largest twist in the blade while the discharge pressure region causing a highest pressure difference and a highest temperature difference on the blade.

6. A fluid compressor comprising:

(a) a cylinder driven by a drive unit and having a suction port and a discharge port;

(b) a cylindrical rotary rod eccentrically disposed in and along said cylinder so that a periphery thereof is partly in contact with an inner face of said cylinder, said cylinder and rod being turnable relative to each other;

(c) an oldham ring supported by said rod and sliding toward and away from an axis of said cylinder according to the rotation of said cylinder, to rotate said rod relative to said cylinder;

(d) a helical groove formed around said rod at pitches that gradually become shorter from a suction port side toward a discharge port side;

(e) a helical blade fitted to said helical groove and movable inwardly and outwardly in said groove, a periphery of said blade being in contact with the inner face of said cylinder and therefore subjected to torsion, to define a plurality of work chambers between the inner face of said cylinder and a peripheral face of said rod, so that a fluid fed through the suction port is compressed and conveyed toward the discharge port through the work chambers according to the rotation of said rod; and (f) said helical blade being formed by pressurizing and injecting tetrafluoroethylene-perfluoroalkylvinylether copolymer resin into a mold through two gates disposed at each end of the mold.

7. The fluid compressor according to claim 6, wherein the helical blade includes a weld line formed where the materials fed through the two gates meet each other during the injection molding, the weld line being located substantially at the center of an intermediate pressure region between a suction pressure region that causes a largest twist in said blade and a discharge pressure region that causes a highest pressure difference and a highest temperature difference on said blade.

* * * * *